Dec. 30, 1969 V. G. KRENKE 3,487,237
ELECTRICAL GENERATOR FOR ENERGIZING A SOURCE OF ULTRASONIC ENERGY
Filed July 7, 1967
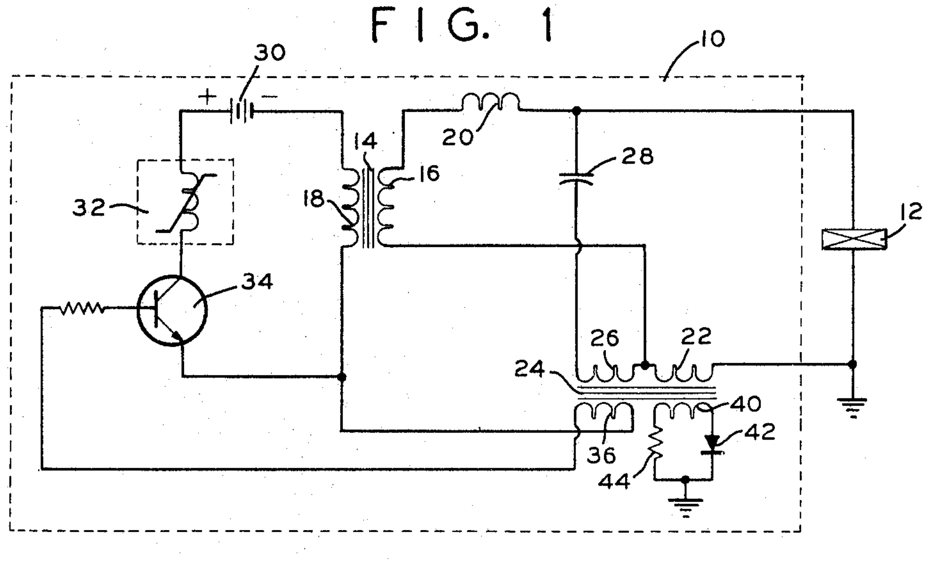
FIG. 2
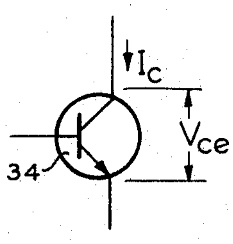
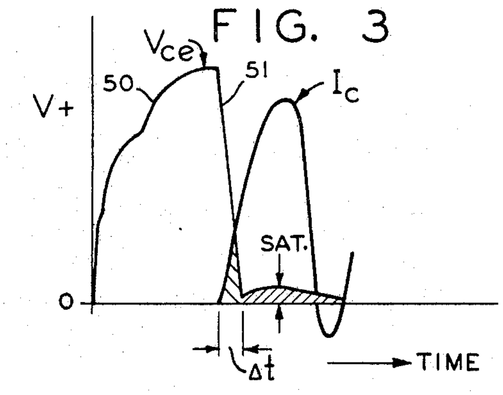
FIG. 4
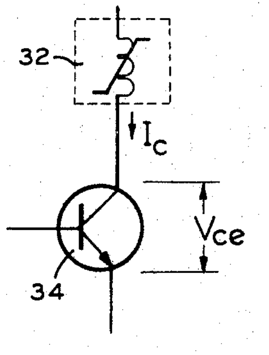
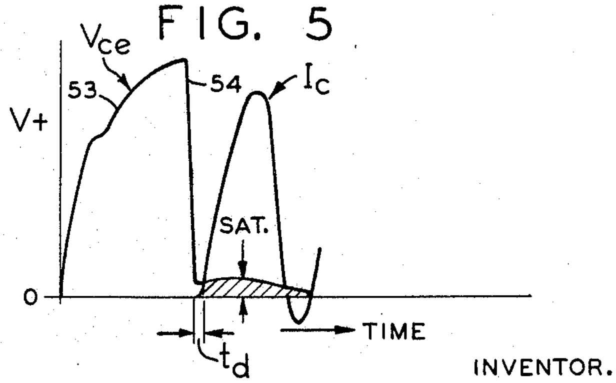
INVENTOR.
VINCENT GERALD KRENKE
BY:
Ervin B. Steinberg United States Patent Office 3,487,237

Patented Dec. 30, 1969

3,487,237

ELECTRICAL GENERATOR FOR ENERGIZING A SOURCE OF ULTRASONIC ENERGY

Vincent Gerald Krenke, Fairfield, Conn., assignor to Branson Instruments, Incorporated, Stamford, Conn., a corporation of Delaware Filed July 7, 1967, Ser. No. 651,890
Int. Cl. H02n *11/00*
U.S. Cl. 310—8.1 11 Claims

ABSTRACT OF THE DISCLOSURE

In a switching circuit using a transistor for switching a capacitive load circuit at an ultrasonic frequency, a saturable reactor is connected in series with the transistor in order to reduce the power dissipation in the transistor. The reactor delays conduction of current through the transistor until the saturation voltage of the transistor is reached.

This invention refers to an improved generator for energizing a source of ultrasonic energy and, more specifically, refers to a generator for energizing an ultrasonic converter which presents a capacitive load to the generator. Quite specifically, this invention refers to a switching circuit which forms a part of a generator adapted to energize one or more piezoelectric transducers which convert electrical energy to vibratory energy at ultrasonic frequency.

When switching a predominantly capacitive load by means of a transistor, particularly at a high frequency, several problems are presented. One of the problems resides in the fact that due to the leading electrical phase angle the current precedes the voltage. Therefore, current flow through the transistor may begin prior to the saturation voltage of the transistor having been reached. This condition causes increased losses in the transistor and limits the switching capacity of the transistor.

The present invention is directed to overcome this problem by providing a saturable reactor coupled in circuit with the transistor to cause a slight delay in current conduction, thus permitting the transistor to reach its saturation voltage level. In this manner the losses within the transistor are significantly reduced and the transistor is capable of switching higher electrical loads than would be possible otherwise.

One of the principal objects of this invention is, therefore, the provision of a new and improved switching circuit for transistors.

Another important object of this invention is the provision of an improved switching circuit for capacitive loads.

Another object of this invention is the provision of an improved transistor switching circuit operable at a high frequency and adapted to switch a predominantly capacitive load.

A further important object of this invention is the provision of a switching circuit for a capacitive load circuit using a transistor and including means for reducing the power dissipation in the transistor.

A further and other object of this invention is the provision of a transistor switching circuit which includes means for causing the transistor to reach its saturation voltage more rapidly and before the onset of current conduction.

Still further and other objects of this invention will be more clearly apparent from the following description when taken in conjunction with the accompanying drawings, in which:

FIGURE 1 is a schematic electrical circuit diagram of the electrical generator coupled to a source of ultrasonic energy;

FIGURE 2 is a schematic electrical circuit diagram of a portion of FIGURE 1 omitting the improvement disclosed herein;

FIGURE 3 is a graph of electrical voltage and current relation existing in the circuit per FIGURE 2;

FIGURE 4 is a schematic electrical circuit diagram of a portion of FIGURE 1, and FIGURE 5 is a graph of electrical voltage and current relation existing in the circuit per FIGURE 4.

Referring now to the figures and FIGURE 1 in particular, an electrical generator, numeral 10, is shown which is coupled to an ultrasonic transducer 12. The transducer, typically, includes one or more piezoelectric disks of barium titanate or lead zirconate titanate for converting high frequency electrical energy, e.g. 20 or 40 kHz., applied thereto to mechanical vibrations. In the preferred embodiment, the transducer is of the clamped sandwich construction as described and illustrated in detail in U.S. Patent No. 3,066,232 issued to N. G. Branson, entitled "Ultrasonic Transducer," dated Nov. 27, 1962. One or more of the transducers may be coupled to the underside or the side wall of a tank for providing ultrasonic energy to a cleaning solution contained in the tank as is well known to those skilled in the art of ultrasonic cleaning.

The generator which generates and supplies the high frequency electrical energy to the transducer comprises as its main parts a power transformer 14 whose secondary output winding 16 is coupled in series with an inductance 20 to the transducer 12 and to the winding 22 of a transformer 24. A capacitor 28 coupled in series with the transformer winding 26 is connected in parallel with the transducer 12.

The primary winding 18 of the power transformer 14 is coupled in series with a source of direct current 30, a reactor 32, and the collector electrode and the emitter electrode of a switching transistor 34. The secondary winding 36 of the transformer 24 develops a signal corresponding to the oscillations of the power circuit, such signal being used as a feedback signal and applied to the base and emitter electrodes of the switching transistor 34 to sustain the oscillations occurring in the power circuit. The feedback signal cyclically switches the transistor ON and OFF. A second secondary winding 40 of the transformer 24 is coupled in series with a rectifier 42 and a resistor 44 to reflect a load in the power circuit during the half-cycle when the transistor 34 is rendered non-conductive.

The saturable reactor 32, the purpose of which will be described later, is coupled in series with the emitter and collector electrodes of the transistor 34.

The above-indicated generator circuit is described in detail in copending application for U.S. Letters Patent Ser. No. 637,301 in the name of Kilian H. Brech et al., filed May 9, 1967 entitled "Ultrasonic Cleaning Apparatus." As explained in that patent application, the generator circuit is basically a regenerative oscillator whose frequency is determined by the combination of the series inductance 20 and the capacitance of the ultrasonic transducer or transducers 12 and that of the capacitor 28 connected in parallel with the transducer. In the preferred embodiment, the values of the inductance 20 and of the capacitor 28 are chosen to provide for the operation of the oscillatory circuit at a frequency which is above that of antiresonance of the transducer, typically a frequency of 42.1 kHz. The values of the capacitor 28 and the turns ratio of the opposing windings 22 and 26 are selected in such a manner that the current responsive signal from the capacitor 28 exceeds the current responsive signal through the transducer 12, thereby providing in the secondary winding 36 a signal which is the difference of the subtraction of both signals and the value of which remains positive. This oscillatory circuit is suited particularly for driving ultrasonic transducers coupled to cleaning tanks, since the circuit suppresses and rejects conditions of electrical admittance peaks caused by resonance conditions effective on the transducer 12.

The circuit, by virtue of the elecrtostrictive transducer 12 and operation at a frequency which is above antiresonance, reflects itself as a predominantly capacitive load on the switching transistor 34. Omitting the saturable reactor 32, and referring to FIGURES 2 and 3 in particular, it will be seen that the main current flows from the collector electrode to the emitter electrode. The voltage $V_{ce}$ existing between the collector and emitter electrodes is indicated by the solid curve 50 in FIGURE 3. As the voltage $V_{ce}$ attains a predetermined forward value, the feedback signal triggers the transistor for current conduction and the saturation voltage of the transistors is attained as shown by the notation SAT. The descending line 51 shows the decrease of the voltage $V_{ce}$ to the saturation voltage, requiring a time interval $\Delta t$. It may be noted, however, that due to the capacitive nature of the load circuit, the current leading the voltage, current $I_c$ is conducted through the transistor prior to the saturation voltage being attained. Since the power dissipation is the product of voltage and current, with the conditions shown in FIGURES 2 and 3, there exists in the transistor 34 the dissipation of power prior to the saturation voltage being attained and the power dissipation subsequent thereto as is indicated by the respectively cross-hatched areas. The current conduction prior to the reaching of saturation voltage has two adverse effects. Firstly, the drop of the voltage $V_{ce}$ to the saturation voltage is delayed and, secondly, the power dissipation prior to the reaching of saturation voltage may exceed the permissible peak power dissipation. This dissipation must be added to the loading of the transistor and reduces the switching power capability of the transistor.

An improved circuit is shown in FIGURES 4 and 5. A saturable reactor 32, specifically a self-saturating reactor, is connected in series with the transistor emitter and collector electrodes. The purpose of the reactor 32 is to momentarily delay the current conduction through the transistor 34, permitting the transistor to reach the saturation voltage before appreciable current conduction occurs. The voltage existing initially between the collector and emitter electrodes $V_{ce}$ is shown by the line 53. The descent of this voltage to the saturation voltage (SAT) is depicted by the line 54, and it should be noted that, due to the absence of current flow, this descent occurs much more rapidly than that in FIGURE 3. It should be noted also that after the saturation voltage is reached there exists a time delay $t_d$ before a substantial amount of current $I_c$ flows through the transistor so that the transistor has only negligible power dissipation until after the saturation voltage has been reached. In this way, the dissipation of power by the transistor prior to its reaching of the saturation voltage is substantially eliminated and the same transistor can be used to conduct a larger amount of load current, thus obtaining a better utilization. Also, since a more rapid drop of the voltage $V_{ce}$ to the saturation voltage level is achieved, the transistor 34 may be used at higher switching rates as is desirable in the above described application.

In a typical example it has been found that the "turn-on time" in FIGURE 3 which is the time interval $\Delta t$, is in the order of 1 to 3 microseconds, whereas in the circuit per FIGURE 5 such time interval is less than one-half microsecond. Typical frequency of the circuit was 42.1 kHz., the transistor 34 being operated at a fifty percent duty cycle. The self-saturating reactor 32 was made by winding four turns of wire on an E-core Ferrite material RO–3 obtained from the Allen-Bradley Company of Milwaukee, Wis. This core has a substantially square loop magnetic characteristic so that the reactor initially provides a circuit impedance, but once the core is saturated only the direct current resistance remains which does not upset tuning of the circuit, as would be the case if a linear inductance were used. Typical current conduction was 10 to 12 amperes peak.

It will be apparent that the above principle may be applied equally N-P-N or P-N-P type transistors, observing, of course, the proper polarity connections to the direct current supply 30.

While there has been described and illustrated a certain preferred embodiment of the invention, it will be apparent to those skilled in the art that various changes and modifications may be made without deviating from the broad principle and intent of this invention.

What is claimed is:

1. A generator for energizing a source of ultrasonic energy which presents a substantially capacitive load, said generator including:

- a source of direct current coupled in series with a switching transistor to an oscillatory load circuit exhibiting when operating a predominantly capacitive load characteristic;
- a feedback circuit coupled from said load circuit to said transistor for switching said transistor at an ultrasonic frequency whereby to cyclically establish and terminate current flow through said transistor, and
- a self-saturating reactor coupled in series with the circuit from said source to said transistor for momentarily delaying the conduction of current from said source through said transistor when the transistor is triggered for current conduction and the electrical potential between the collector and emitter electrodes of said transistor is decreasing to the saturation potential, whereby the saturation potential is reached within a shorter span of time.

2. A generator as set forth in claim 1 wherein said saturable reactor comprises an electrical winding disposed on a magnetic core having a substantially square loop magnetic characteristic.

3. A generator as set forth in claim 2 wherein said reactor is dimensioned to delay the conduction of substantial current through said transistor until the saturation potential of said transistor is attained.

4. A generator as set forth in claim 2, said reactor being coupled in series with the emitter and collector electrodes of said transistor.

5. A generator as set forth in claim 2, said transistor being switched at a frequency of at least 20 kHz.

6. A generator as set forth in claim 2, and including a second transformer winding coupled to the first-stated winding, said second winding being normally coupled to a predominantly capacitive load.

7. A generator as set forth in claim 2 wherein said transistor is of the N-P-N type.

8. A generator as set forth in claim 2 wherein said transistor is of the P-N-P type.

9. A generator for energizing a source of ultrasonic energy which represents a substantially capacitive load, said generator including:

- a transformer having a primary and a secondary winding;
- a source of direct current coupled in series with a switching transistor and a self-saturating reactor to said primary winding;
- said secondary winding being coupled to an oscillatory load circuit which includes at least one electrostrictive transducer and which exhibits a predominantly capacitive load characteristic;
- a feedback circuit coupled from said load circuit to said transistor for switching said transistor at an ultrasonic frequency whereby to cyclically establish and terminate current flow from said direct current source through said transistor and reactor to said primary winding, and said reactor being dimensioned to initially present a circuit impedance to delay substantial current flow through said transistor when the feedback signal applied to said transistor triggers said transistor for current flow therethrough, whereby to cause the electrical potential existing between the emitter and collector electrodes of said transistor to decrease rapidly to the saturation voltage, and said saturating reactor subsequently presenting substantially only an ohmic resistance to the current flow.

10. A generator as set forth in claim 9, said saturable reactor preventing substantial current flow through said transistor prior to the saturation voltage having been reached.

11. In an apparatus for driving a load circuit which includes an ultrasonic transducer having a natural frequency of vibration and exhibiting a capacitive reactance, the combination of:

an oscillatory circuit comprising an inductance connected in series with the parallel connection of a capacitor and said transducer, said oscillatory circuit being tuned to a frequency which is higher than the antiresonance frequency of said transducer;

summing means coupled in circuit between said transducer and said capacitor for subtracting a first signal responsive to the current through said transducer from a second signal responsive to the current through said capacitor, said capacitor and summing means being selected to cause said second signal to be larger than said first signal, whereby to provide a different signal which decreases in amplitude as the current through said transducer increases;

a driving circuit, which includes the series connection of a source of direct current electrical energy, a self-saturating reactor and a transistor operable as a switching means, coupled to said oscillatory circuit, and means coupling the difference signal from said summing means as a feedback signal to said transistor for controlling the operation of said driving circuit, whereby to sustain operation of said oscillatory circuit, and said saturating reactor being dimensioned for momentarily delaying the conduction of current through said transistor when said feedback signal triggers said transistor for current conduction and the electrical potential between the collector electrode and the emitter electrode of said transistor is decreasing to the saturation potential.

References Cited

UNITED STATES PATENTS

| | | | |
|---|---|---|---|
| 3,394,275 | 7/1968 | Lippmann | 310—8.3 |
| 3,318,578 | 5/1967 | Branson. | |
| 3,100,886 | 8/1963 | Marks | 310—8.7 X |
| 2,998,547 | 8/1961 | Berman. | |
| 2,946,896 | 7/1960 | Alizon et al. | |

MILTON O. HIRSHFIELD, Primary Examiner

MARK O. BUDD, Assistant Examiner

U.S. Cl. X.R.

307—214